United States Patent
Das et al.

(10) Patent No.: US 9,285,970 B2
(45) Date of Patent: Mar. 15, 2016

(54) METHOD AND APPARATUS FOR DISPLAYING NAVIGATIONAL VIEWS ON A PORTABLE DEVICE

(75) Inventors: Sujoy Das, Grayslake, IL (US); Vishal Shashikant Patil, Mysore (IN)

(73) Assignee: Google Technology Holdings LLC, Mountain View, CA (US)

(*) Notice: Subject to any disclaimer, the term of this patent is extended or adjusted under 35 U.S.C. 154(b) by 371 days.

(21) Appl. No.: 13/002,675

(22) PCT Filed: Jul. 22, 2009

(86) PCT No.: PCT/US2009/051373
§ 371 (c)(1),
(2), (4) Date: Jan. 5, 2011

(87) PCT Pub. No.: WO2010/011728
PCT Pub. Date: Jan. 28, 2010

(65) Prior Publication Data
US 2011/0109543 A1  May 12, 2011

(30) Foreign Application Priority Data

Jul. 25, 2008 (IN) .......................... 1750/DEL/2008

(51) Int. Cl.
*G06F 3/0484* (2013.01)
*G06F 1/16* (2006.01)
(Continued)

(52) U.S. Cl.
CPC .......... *G06F 3/04845* (2013.01); *G06F 1/1626* (2013.01); *G06F 1/1647* (2013.01); *G06F 1/1684* (2013.01); *G06F 1/1694* (2013.01); *G06F 3/0483* (2013.01);
(Continued)

(58) Field of Classification Search
CPC .................. G06F 2200/1614; G06F 3/04845; G06F 3/0346
USPC ............................................ 345/156, 1.1–1.3
See application file for complete search history.

(56) References Cited

U.S. PATENT DOCUMENTS 7,142,195 B2  11/2006  Northway et al.
2005/0140565 A1  6/2005  Krombach
(Continued)

FOREIGN PATENT DOCUMENTS

EP  2101243 A1  9/2009
EP  2109031 A2  10/2009
(Continued)

OTHER PUBLICATIONS

International Preliminary Report on Patentability from International Application No. PCT/US2009/051373, mailed Feb. 3, 2011 7 pp.
(Continued)

*Primary Examiner* — Amare Mengistu
*Assistant Examiner* — Sarvesh J Nadkarni
(74) *Attorney, Agent, or Firm* — Shumaker & Sieffert, P.A.

(57) ABSTRACT

A portable device (100) includes an orientation engine (118) and a display controller (106). The display controller displays a navigational view on a first display (102). Upon detecting a reorientation of the device (610), the display control displays a second navigational view (204). The second navigational view is related to the first navigational view by a relationship dictated by the direction of orientation change, and may be displayed on the first display or on a second display (104), depending on the manner of reorientation.

19 Claims, 5 Drawing Sheets

(51) Int. Cl.
*G06F 3/0483* (2013.01)
*H04M 1/725* (2006.01)

(52) U.S. Cl.
CPC ............ *G06F 2200/1614* (2013.01); *G06F 2200/1637* (2013.01); *G06F 2203/04806* (2013.01); *H04M 1/72522* (2013.01); *H04M 2250/12* (2013.01); *H04M 2250/16* (2013.01)

(56) References Cited

U.S. PATENT DOCUMENTS

| | | | |
|---|---|---|---|
| 2006/0154702 A1* | 7/2006 | Kang et al. | 455/575.3 |
| 2006/0197714 A1* | 9/2006 | Chang | 345/1.1 |
| 2007/0188450 A1* | 8/2007 | Hernandez et al. | 345/158 |
| 2008/0024288 A1* | 1/2008 | Kageyama et al. | 340/461 |
| 2009/0207184 A1* | 8/2009 | Laine et al. | 345/619 |

FOREIGN PATENT DOCUMENTS

| | | |
|---|---|---|
| EP | 2129091 A1 | 12/2009 |
| WO | 02933331 A1 | 11/2002 |

OTHER PUBLICATIONS

International Search Report and Written Opinion from International Application No. PCT/US2009/051373, mailed Apr. 8, 2010 13 pp.

\* cited by examiner

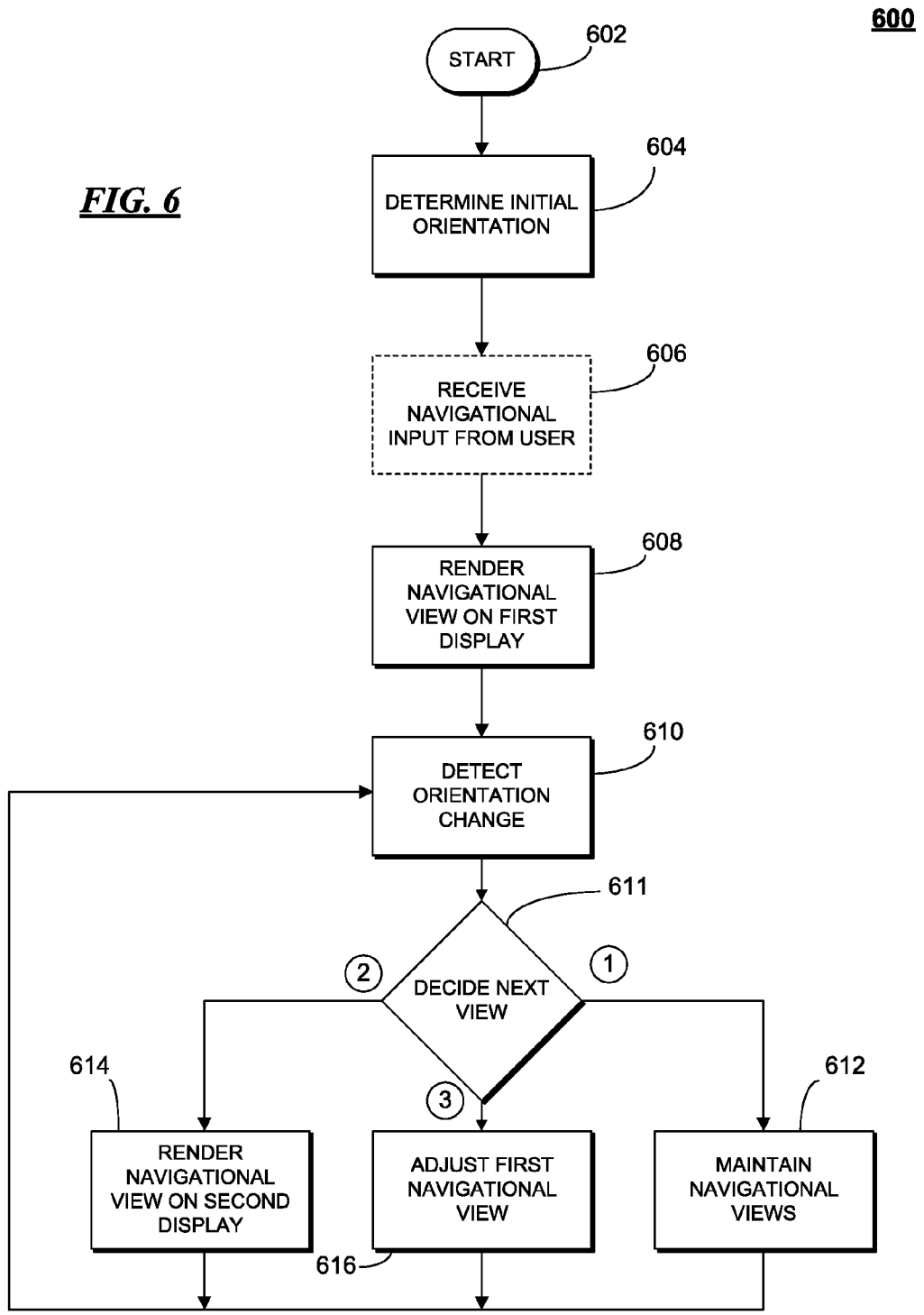

METHOD AND APPARATUS FOR DISPLAYING NAVIGATIONAL VIEWS ON A PORTABLE DEVICE

FIELD OF THE INVENTION

The invention relates generally to user interfaces for portable electronic devices, and more particularly to displaying navigational views of various media on a display of a portable electronic device.

BACKGROUND OF THE INVENTION

Portable electronic devices, such as cellular telephones, personal digital assistants, palm-top computers, and others, present information to users primarily in the form of graphical information. This is particularly true when the device is used to navigate media and directory information, as well as Web content. For example, the display of a device may be used to show a phone list, a directory of files such as image files, sections of a document, a web page, different zoom levels of a map, and so on. The views presented maybe referred to as navigational views as user is able to navigate the media, resulting in different navigational views being presented. Navigating media may be accomplished in a variety of ways, such as, for example, scrolling. Portable devices, however, being limited in size, present a challenge for navigating various media. On larger computing systems, users are provided with user interface elements which readily facilitate media navigation, such as pointing devices ("mice"), full-sized keyboards, and larger displays. Additionally, larger computing systems are provided with I/O connection means such as Universal Serial Bus (USB) adapters which allow a variety to I/O devices to be used with these systems which are not readily available for smaller, portable computing systems. Accordingly, there is a need for means by which users can more easily navigate media and other information in small, portable devices.

SUMMARY OF THE INVENTION

The invention provides in one embodiment a navigation interface for a portable device. The portable device may include a first display on a first external surface of the portable device, and a second display on a second external surface of the portable device. The device further includes an orientation engine which is configured to determine orientation of the portable device and provide an orientation change parameter in response to the orientation of the portable device changing, for example, from a first orientation to a second orientation. The orientation change parameter indicates a direction of orientation change. The device further includes a display controller operably coupled to the orientation engine which is configured to display a first navigational view on the first display when the portable device is in the first orientation, and display a second navigational view on the second display when the orientation of the portable device is changed to the second orientation. The first and second navigational views have a relationship which is determined at least in part by the direction of orientation change, as indicated by the orientation change parameter.

The invention, in another embodiment, provides a method of presenting navigational views of media on a portable device. The method commences by displaying a first navigational view on a first display. The first display is disposed on a first side of the portable device, and is initially facing in a user direction. The method then commences by detecting a reorientation of the device such that a second display disposed on a second surface of the device is then facing in the user direction. The reorientation direction of orientation change is also detected. The method continues by displaying a second navigational view on the second display. The second navigational view has a relationship to the first navigational view which is determined by the direction of orientation change.

Another embodiment of the invention provides a method of displaying navigational views of media of a portable device which commences by displaying a first navigational view of a media source on a first display disposed on a first side of the portable device. The first display is initially facing in a user direction. The method continues by detecting a first reorientation of the portable device indicating the portable device has been spun at least a partial rotation in either a clockwise or counter-clockwise manner relative to the user direction. The device then displays a second navigational view on the first display in response to detecting the at least partial rotation, wherein the second navigational view is related to the first navigational view by being a different zoom level of the media source.

BRIEF DESCRIPTION OF THE DRAWINGS

There are shown in the drawings, embodiments which are presently preferred, it being understood, however, that the invention is not limited to the precise arrangements and instrumentalities shown.

FIG. 6 shows a flow chart diagram of a method of presenting related navigational views of media on multiple displays of a portable device in correspondence with reorienting the portable device, in accordance with an embodiment of the invention.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The invention solves the problem of limited means of providing navigational input on small, portable devices by using changes in orientation of the device itself to provide related navigational views on different displays provided on the device. Given two displays mounted on external surfaces of the device, while navigating some media, the device is reoriented such as by flipping the entire device over. A first navigation view is presented on one display while it faces a user. Upon reorienting the device such that a second display is facing the user, a different navigation view is presented on the second display which is related to the navigational view presented on the first display. This provides the ability to, for example, page through a document by flipping the device over as one would turn pages of a book. Flipping the device in another direction along a different axis may allow an additional navigational view having a different relationship. For example, flipping the device over a first axis may scroll the present view of a large media file, such as a map, while flipping the device over a different axis may cause the view to zoom in or out of a map section.

Figure 1:
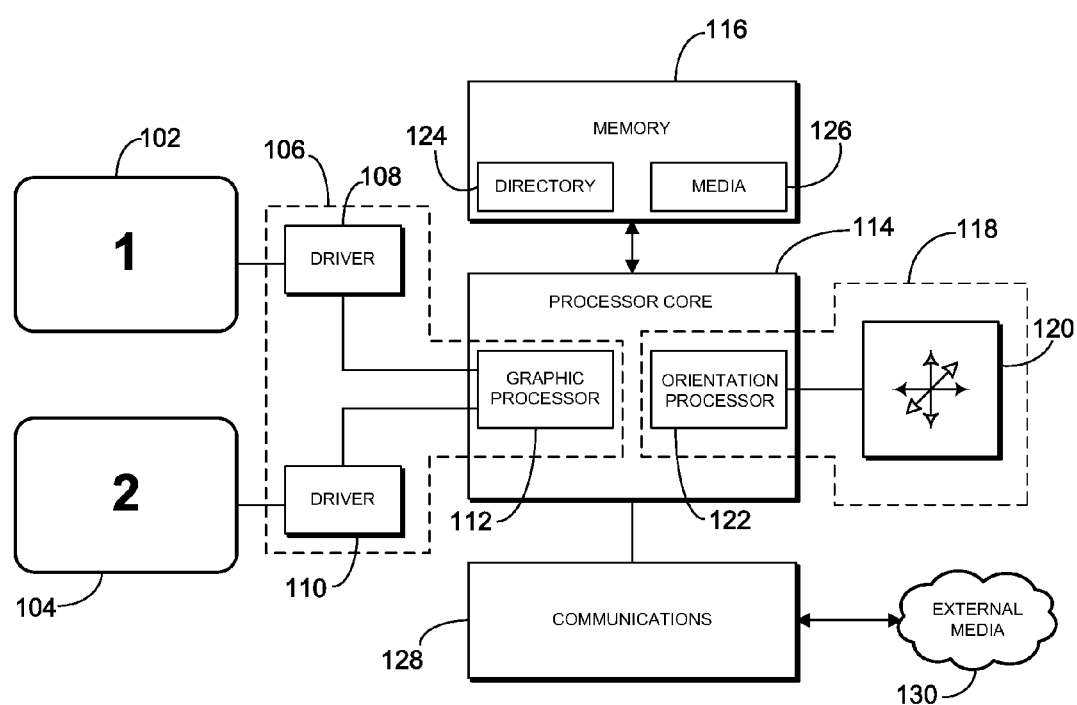
FIG. 1 shows a block system schematic diagram of a portable device having a navigational interface in accordance with an embodiment of the invention.

Referring to FIG. 1, there is shown a block system schematic diagram of a portable device 100 having a navigational interface in accordance with an embodiment of the invention. The device includes a first display 102 and a second display 104. The first and second displays are mounted on external surfaces of the device, and may be mounted on opposing major surfaces of the device such that they face in opposite directions. The displays are controlled by a display controller 106 which includes first and second display drivers 108, 110, respectively, which cause the displays to render videographic information produced by a graphic processor 112, which may be part of a processor core 114. The graphic processor receives media and other output information and routes it to the appropriate driver, as will be explained, in accordance with the invention. Furthermore, the graphic processor may include dedicated hardware components for processing videographic information, as well as using software components executed on dedicated processors as well as software components instantiated on a central controller or processor of the processor core.

The processor core may be implemented as a single microprocessor with subordinate processors/controllers for dedicated subsystem control, as is well known in the art. The processor core executes machine readable instruction code stored in a memory 116. The memory as shown here is an aggregate memory which may include read-only memory elements (ROM), random access memory elements (RAM), as well as semi-permanent memory elements such as Flash memory.

To determine the orientation of the device and changes in orientation, an orientation engine 118 is provided. The orientation engine includes an orientation sensor array 120 which may be, for example, an array of accelerometers such as those used in microelectromechanical switches (MEMS). The array is able to determine acceleration in each of three mutually orthogonal axes. Through sensing acceleration, an orientation processor 122 is able to determine the direction of gravity, as well as the particular direction the device is turned, rotated, spun, or flipped when it is reoriented. This allows the device to determine when, for example, it has been flipped over one axis or another, and in which direction it has been flipped (left or right), as well as if it has been spun clockwise or counter-clockwise upon being reoriented. Generally, the device will assume that the display facing up, away from the direction of gravity, is facing the user, although it is contemplated that the user may provide an indication otherwise. For example, a user may use the device while laying down and holding the device overhead, in which case the display facing down is facing the user. Regardless, the direction of gravity provides a base for determining which display is presently facing the user and operation will be commenced accordingly. The orientation processor, as with the graphic processor, may be implemented by a combination of software and hardware elements. Generally, the orientation engine 118 is operably coupled to the display controller 106 via, for example, data, signal, hardware, or any combination of such. The orientation processor outputs or otherwise provides an orientation change parameter indicating that the orientation has changed, and the manner or direction of change. Small orientation changes which do not result in the device orientation being changed to a new position are ignored. The display controller is configured to display a first navigational view on the first display when the portable device is in the first orientation, and display a second navigational view on the second display when the orientation of the portable device is changed to the second orientation. The first and second navigational views have a relationship which is determined at least in part by the direction of orientation change as indicated by the orientation change parameter.

The displays 102, 104 may be used to show navigational views of information stored in the device, such as directory information 124, or media 126 such as image files in a slideshow presentation format. Alternatively, the device may be provided with a communication means 128 which allows the device to communicate with other devices directly or over a network, and obtain external media 130 such as Web content, maps, and so on. The communication means may include wireless communication means such as cellular, "WiFi", Bluetooth, and other wireless communication formats.

Figure 2:
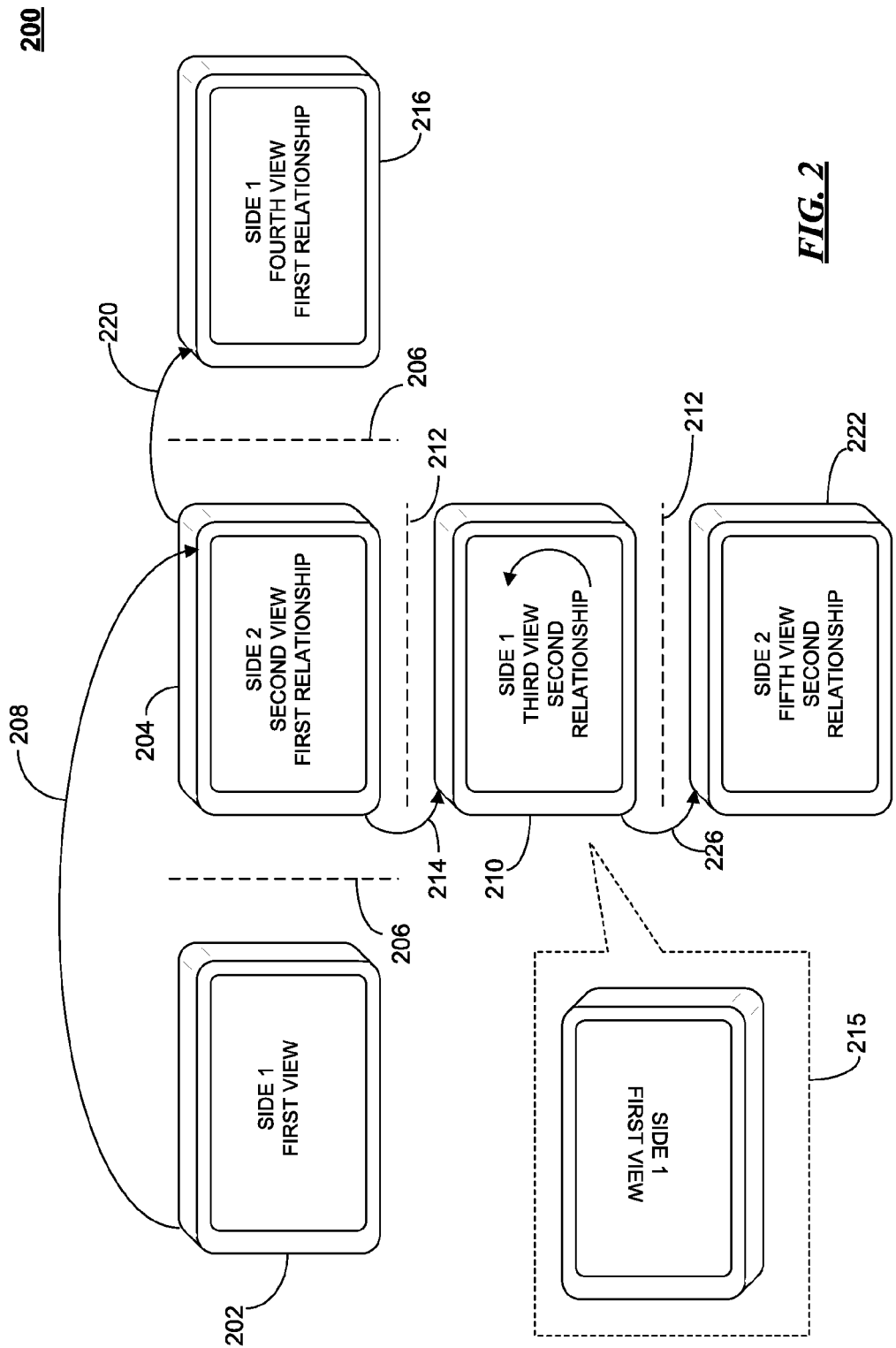
FIG. 2 shows a sequence diagram of presenting various navigational views on a plurality of displays on a portable device in correspondence with the portable device being reoriented, in accordance with an embodiment of the invention.

Referring now to FIG. 2, there is shown a sequence diagram 200 of presenting various navigational views on a plurality of displays on a portable device in correspondence with the portable device being reoriented, in accordance with an embodiment of the invention. The sequence starts with a first view 202 presented on a first display of the device where the first display is disposed on a first side of the device. The device is shown in each step of the sequence as how a user would see the device, and thus the displays shown can be said to be facing in a user direction since the user will be viewing the displays as shown. The initial orientation may be determined by determining the direction of gravity, and assuming the display facing up is facing in the user direction, unless otherwise indicated by the user. In the present example, the device is reoriented to a second view 204 on a second side of the device by reorienting the device. The reorientation occurs by flipping the device over an axis 206 along it's short side. An arrow 208 shows how, as a result of flipping the device, and back left corner becomes a front right corner with respect to the user. In the present example, the second view has a first relationship with first view, as dictated by the direction of reorientation (flipping over axis 206). The relationship may be any of a variety of relationships among navigational views. For example, the first and second navigational views may be successive images in an image directory, successive sections of a directory as would be seen by scrolling or using a "page down" function, adjacent portions of a large file or document, and so on.

The device can be reoriented in a different manner/direction causing a third navigational view 210 to be displayed on the first side, which would then be facing the user. Since this third navigational view is the result of reorienting the device in a different manner, such by flipping over an axis 212 as indicated by arrow 214, the third navigational view is produced from the second navigational view by a second relationship which is different than the first relationship. For example, the third navigational view may be a zoomed view of a portion of the media displayed in the second navigational view, or it may be simply a section of a document or large file under the section showed in the second navigational view. It should be noted that when flipping the device to obtain the third navigational view, the device is inverted with respect to the first view 202. Had the first navigational view been maintained on the first display, it would appear as shown in view 215. Accordingly, the display controller inverts the view so that the top of the media being displayed appears at the top of the screen, as viewed by the user.

However, if, instead of reorienting the device from the second view 204 to the third view 210 over axis 206, the device is again reoriented in the same direction as was used in changing from the first view to the second view, a fourth view 216 results using the first relationship displayed on the first display. The first view in view 202 is gone and replaced by the fourth navigational view. It should be noted that referring to the various navigational views as first, second, third, etc. is only meant to distinguish them from each other, and not meant to imply any ordering. The fourth navigational view, as used here, will result from the second navigational view if the device is reoriented from the second view 204 to the view 216, in which case the third navigational view is irrelevant. Similarly, a fifth navigational view 222 can be obtained from the third navigational view by reorienting the device from the position in view 210 by again flipping it over axis 212. Since the direction of change in the orientation is the same as that used to go from the second to the third navigational view, the second relationship is used to derive the fifth navigational view from the third navigational view. An indication of the change in orientation from one position to another, along with the direction of change, is provided by the orientation engine. The display controller then determines what view to show on the display facing the user as a result of the change of orientation, based on the desired relationship corresponding to the direction of change. It should be noted that whenever the device is reoriented such that a new navigational view is displayed, the previous navigational view may be maintained on the display facing away from the user so that, should the orientation change be reversed, the previous navigational view will still be seen.

Figure 3:
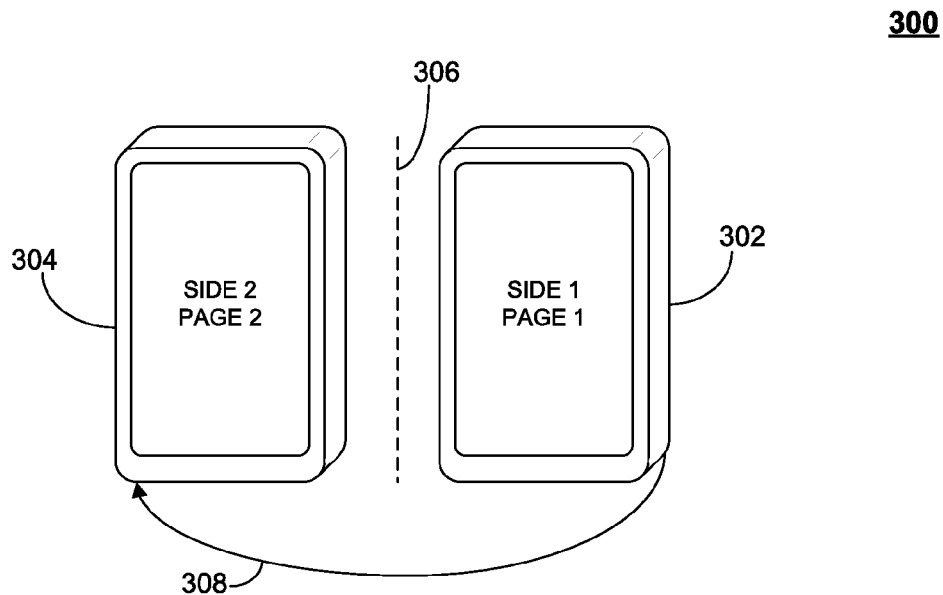
FIG. 3 shows a sequence diagram of a book form of presenting navigational views of media on a portable device, in accordance with an embodiment of the invention.

Referring now to FIG. 3, which shows a sequence diagram 300 of a book form of presenting navigational views of media on a portable device, in accordance with an embodiment of the invention. As mentioned, the device is used in the present example as an electronic book, displaying page a page of text on the displays. The device is positioned in a "portrait" position here, as opposed to the "landscape" position used in FIG. 2, although either position may be used. A first page is shown in view 302 on the first side of the device. The device is then reoriented by flipping it over axis 306 to view the second side 304 where a second page of text is displayed. The direction of change is similar to that of turning a page of a book, as indicated by arrow 308. Thus, in this example, the first and second navigational views have a relationship of being successive pages of text. Flipping the device over axis 306 again in the direction of arrow 308 would result in a third successive page of text being displayed on the first display, where the first page of text was previously displayed. Reversing the direction of change (308) would present the second page of text to the user on the second side/display, where it was being maintained. From that point, flipping the device one more time in the reverse direction of arrow 308 would result in the original, first page of text again being displayed, replacing the third page of text. Other media may be viewed in this manner as well. For example, a directory of image files, such as photographs taken with a camera built into the device (not shown) may be viewed as though each picture were a page of a book.

Figure 4:
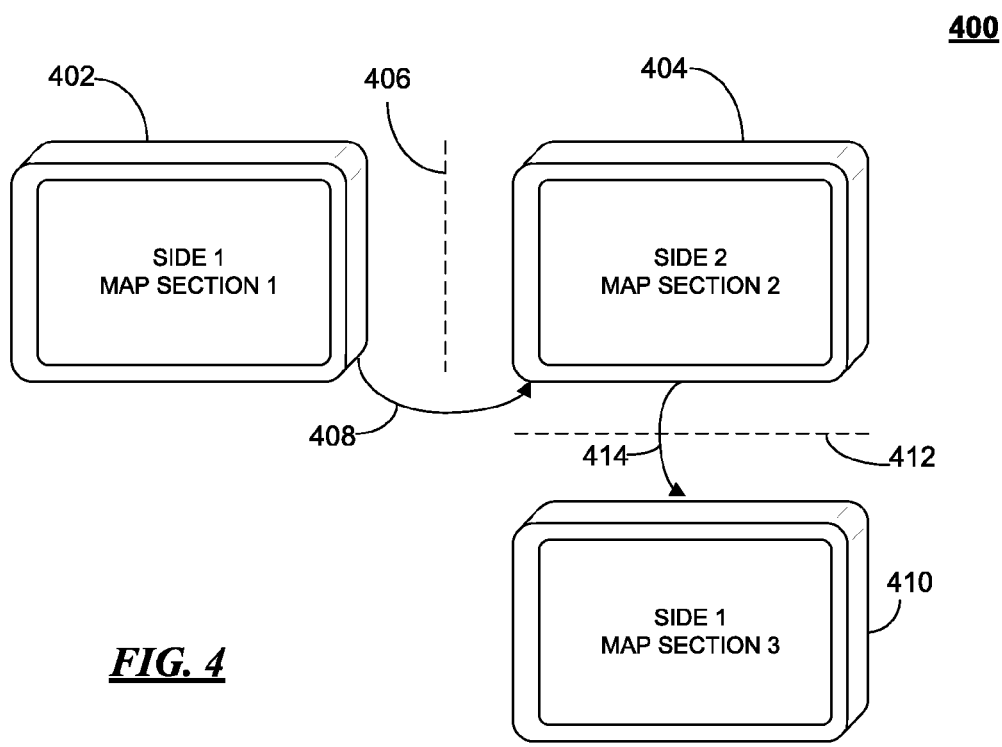
FIG. 4 shows a sequence diagram of presenting various navigational views on a plurality of displays on a portable device in correspondence with the portable device being reoriented, in accordance with an embodiment of the invention.

FIG. 4 shows a sequence diagram 400 of a similar format of navigating media as shown in FIGS. 2 and 3, where a map is being viewed. Because a map is a large media object, and may even be a continuous object, such as a global map, in order to see any significant detail only a portion of the map is displayed. In a first view 402, a first map section is shown on a first display. Flipping the device over axis 406 to the right as indicated by arrow 408, results in map section 2, a section immediately to the east of map section 1, to be displayed on the second display of the device 404. Similarly, flipping the device over axis 412, as indicated by arrow 414, results in a third view 410 being displayed on side 1, wherein the third view is a third map section that is immediately to the south of map section 2. Thus, flipping the device to the right has the relationship of showing sections to the east, whereas flipping the device down (414) has the relationship of showing sections to the south, and so on.

Figure 5:
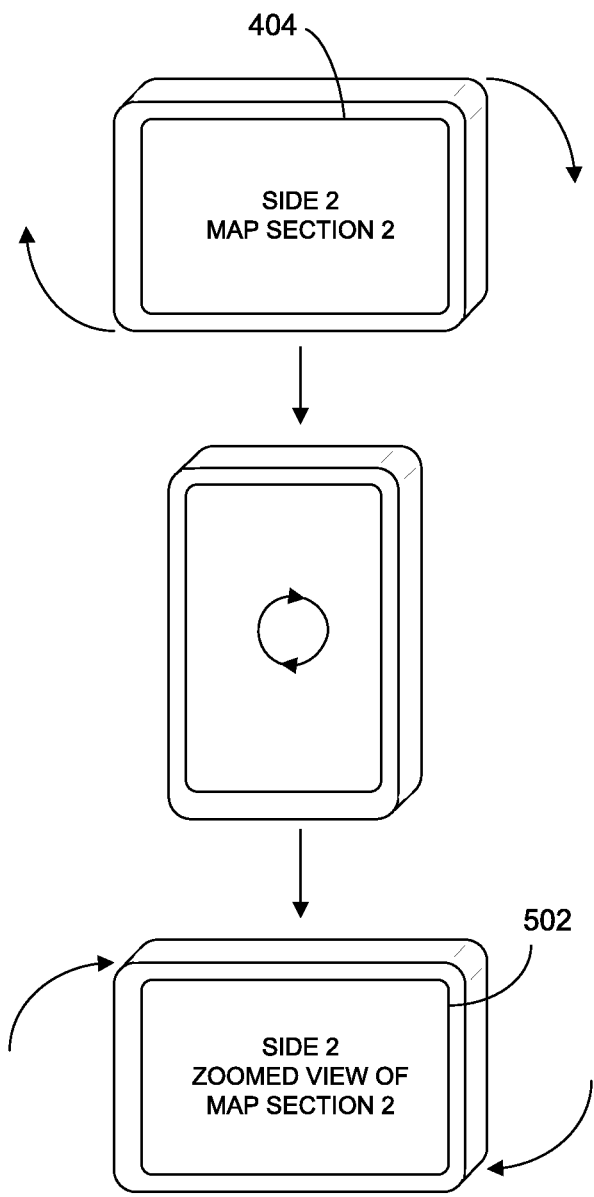
FIG. 5 shows a sequence diagram of presenting navigational views of media on a portable device where rotating the device is used to reorient the device to produce a new navigational view, in accordance with an embodiment of the invention.

FIG. 5 shows a sequence diagram 500 of presenting navigational views of media on a portable device where rotating the device is used to reorient the device to produce a new navigational view, in accordance with an embodiment of the invention. The present example follows from that shown in FIG. 4. Specifically, in FIG. 4, large sections of the map may be navigated. In view 404 of map section 2, the user may wish to zoom into the map section to see more detail. In the present example, the user rotates the device clockwise, such that the second side remains facing the user. The display controller is configured to alter the second navigational view upon the portable device being reoriented by spinning the portable device in a partial rotation such that the second display remains oriented in the same direction. The orientation engine detects the change of orientation, based on acceleration, and determines that the direction of change is a clockwise rotation. Accordingly, the display controller displays a zoomed view of map section 2, where the zoom factor may be preselected. Following the present example, rotating the device counter-clockwise causes the view to zoom out. Altering the navigational view here includes adjusting parameters associated with the media being displayed, and may include a zoom level or factor, a playback speed, or an audio volume adjustment.

The reorientations used in FIG. 2-5 can be used for navigating various media and other information that is presented videographically. For example, reorienting the device may be used to navigate an audio or video file, where flipping the device left/right results in a rewind or fast-forward effect, respectively, and flipping the device up and down selects a previous or next media file, respectively, to be played, while rotating the device control audio volume. Those skilled in the art will realize the inventive principles have wide application and can be configured in numerous formats for navigating a wide variety of information. Furthermore, it is contemplated that, prior to a reorientation of the device, a user may provide some input, such as by a touch screen, indicating an additional parameter to use in generating a next navigational view upon reorientation. For example, in navigating a map, the user may point to a certain location on the map, and the device will use the coordinates indicated by the input as the center of the next map section displayed upon reorientation.

Referring now to FIG. 6, there is shown a flow chart diagram 600 of a method of presenting related navigational views of media on multiple displays of a portable device in correspondence with reorienting the portable device, in accordance with an embodiment of the invention. At the start 602, the device is powered on and ready to display information. The device, via the orientation engine, may determine and initial orientation (604). The initial orientation is determined by first determining the direction of gravity, and then assuming the display facing away from the direction of gravity (facing up) is facing the user and will be the first display on which to render information. Alternatively, the user may indicate that the other display is to be used as the first display. Subsequently, the device may receive some navigational input from the user (606). For example, the user may indicate or select which media or information is to be viewed. Input may be performed by use of buttons on the device, or the displays themselves may be touch-screen displays which accept tactile input. The device may, for example, display a navigational menu with "soft" buttons displayed on the display, and receive user input accordingly. Subsequently, the device then displays the first navigational view on the first display (608). The orientation engine monitors the orientation of the device, and indicated, for example, by acceleration sensors. Upon the device detecting a sufficient reorientation of the device (610), the device has several options, depending on the direction of orientation change, and whether a different display is now facing the user. A decision box 611 represents this process of deciding on the appropriate response to the change of orientation. First, the device may make no change (612), as when a most recent change of orientation is reversed, and the information displayed on a display facing away from the user is to be viewed again. Second, the device may render a next, or second, navigational view on a second display which was previously facing away from the user but which, due to the device being reoriented, is now facing the user (614). The view rendered on the second display relates to the navigation view on the first or previously viewed display based on the direction of reorientation. The second navigational view may have different relationships with the first navigation view, depending on the direction of reorientation. Third, the navigational view on the first display may be altered if the reorientation result in the first display is still facing the user (616), such as when the device is spun clockwise or counter-clockwise. In which case the second navigational view is produced by adjusting parameters of the first navigational view, including parameters such as, for example, a zoom level, playback speed, and audio volume. The device then returns to 610 to monitor for orientation changes.

This invention can be embodied in other forms without departing from the spirit or essential attributes thereof. Accordingly, reference should be made to the following claims, rather than to the foregoing specification, as indicating the scope of the invention.

What is claimed is:

1. An electronic device comprising:
 a first external surface comprising a first display;
 a second external surface that is opposite the first external surface, the second external surface comprising a second display;
 an orientation engine configured to:
  determine an orientation of the electronic device relative to a user of the electronic device, wherein the first display faces towards the user while the electronic device is oriented in a first orientation and the second display faces towards the user while the electronic device is oriented in a second orientation; and
  in response to detecting a change in orientation of the electronic device, generate an orientation change parameter indicative of the orientation of the electronic device and
 a direction of rotation during the change; and
 a display controller operably coupled to the orientation engine and configured to:
  output, for display at the first display, a first navigational view of a navigable media source when the orientation change parameter indicates that the electronic device is orientated in the first orientation;
  after outputting the first navigational view for display, output, for display at the second display, a second navigational view of the navigable media source when the orientation change parameter indicates that the electronic device is orientated in the second orientation after rotating about a first axis of the electronic device in a first rotational direction; and
  after outputting the second navigational view, output, for display at the first display, a third navigational view of the navigable media source when the orientation change parameter indicates that the electronic device is orientated in the first orientation after rotating about a second axis of the electronic device in a second rotational direction, wherein:
   the first and second navigational views are related at least in part by the first rotational direction;
   the second and third navigational views are related based at least in part by the second rotational direction; and
   the third navigational view is different from the first navigational view and the first and third navigational views are related based at least in part by a combination of the first and second rotational directions.

2. The electronic device of claim 1, wherein the orientation engine comprises a plurality of accelerometers configured to sense an amount of acceleration in each of three orthogonal dimensions and the orientation engine is further configured to detect the change in the orientation of the electronic device based on the amount of acceleration in each of the three orthogonal dimensions.

3. The electronic device of claim 1, wherein the first and second navigational views comprise respective navigational views of consecutively ordered files in a file directory.

4. The electronic device of claim 3, wherein the second navigational view is a first scrolled view of the first navigational view and the third navigational view is second scrolled view of the first navigational view.

5. The electronic device of claim 1, wherein the first and second navigational views comprise respective views of consecutive pages of an electronic document.

6. The electronic device of claim 5, wherein the third navigational view is a zoomed view of the second navigational view.

7. The electronic device of claim 1, wherein the first navigational view comprises a first perspective of the navigable media source and the second navigational view comprises a second perspective of the navigable media source, the first perspective being different from the second perspective.

8. The electronic device of claim 1, wherein the first navigational view comprises a first portion of the navigable media source and the second navigational view comprises a second portion of the navigable media source, the first portion being different from the second portion.

9. The electronic device of claim 1, wherein the first navigational view comprises a first zoom level of the navigable media source and the second navigational view comprises a second zoom level of the navigable media source, the first zoom level being different from the second zoom level.

10. The electronic device of claim 1, wherein:
the first and second navigational views comprise navigational views of respective sections of an electronic map;
the first and second navigational views comprise a first zoom level of the respective sections of the electronic map; and
the third navigational view comprises a second zoom level of the respective section of the electronic map associated with the first navigational view or the second navigational view.

11. The electronic device of claim 1, wherein:
the first, second, and third navigational views each comprise a respective section of an electronic map;
the respective section of the electronic map of the second view is west or east of the respective section of the electronic map of the first view; and
the respective section of the electronic map of the third view is north or south of the respective section of the electronic map of the second view.

12. A method comprising:
while an electronic device is oriented in a first orientation, outputting, for display at a first display of the electronic device, a first navigational view of a navigable media source, wherein the first display is disposed on a first external surface of the electronic device and faces towards a user while the electronic device is oriented in the first orientation;
after outputting the first navigational view for display, detecting a first change in orientation of the electronic device from the first orientation to a second orientation, wherein:
a second display is disposed on a second external surface of the electronic device and faces towards the user while the electronic device is oriented in the second orientation;
the first display faces away from the user while the electronic device is oriented in the second orientation; and,
detecting the first change in the orientation comprises detecting a first rotational direction of the change in the orientation;
responsive to detecting the first change in the orientation, outputting, for display at the second display, a second navigational view of the navigable media source, wherein the second navigational view and the first navigational view are related based at least in part on the first rotational direction;
after outputting the second navigational view for display, detecting a second change in the orientation of the electronic device from the second orientation to the first orientation, wherein detecting the second change in the orientation comprises detecting a second rotational direction of the change in the orientation, and
responsive to detecting the second change in the orientation, outputting, for display at the first display, a third navigational view of the navigable media source, wherein the second and third navigational views are related based at least in part by the second rotational direction, the third navigational view is different from the first navigational view, and the first and third navigational views are related based at least in part by a combination of the first and second rotational directions.

13. The method of claim 12, wherein detecting the first and second changes in the orientation comprise detecting, by a plurality of accelerometers of the electronic device, an acceleration of the electronic device in each of three orthogonal dimensions.

14. The method of claim 12, wherein the first and second navigational views comprise respective navigational views of consecutively ordered files in a file directory.

15. The method of claim 14, wherein the second navigational view is a first scrolled view of the first navigational view and the third navigational view is second scrolled view of the first navigational view.

16. The method of claim 12, wherein the first and second navigational views comprise respective navigational views of consecutive pages of an electronic document.

17. The method of claim 16, wherein the third navigational view is a zoomed view of the second navigational view, the zoomed view comprising more detail of the electronic map than the second navigational view.

18. The method of claim 12, wherein the navigable media source comprises an ordering of files, the first navigational view comprises a first section of the ordering of files, and the second navigational view comprises a second ordering of the ordering of files, the first section being adjacent to the second section.

19. The method of claim 12, wherein the first navigational view comprises a first zoom level of the navigable media source and the second navigational view comprises a second zoom level of the navigable media source, the first zoom level being different from the second zoom level.

* * * * *